United States Patent
Hautamaki et al.

(10) Patent No.: US 9,465,414 B2
(45) Date of Patent: Oct. 11, 2016

(54) USER-REMOVABLE DEVICE COVER

(71) Applicant: Nokia Corporation, Espoo (FI)

(72) Inventors: Mika Antero Hautamaki, Vesilahti (FI); Daniel Anto Ruud Dhondt, Espoo (FI); Janne Tapani Kilpinen, Toijala (FI)

(73) Assignee: NOKIA CORPORATION, Espoo (FI)

( * ) Notice: Subject to any disclaimer, the term of this patent is extended or adjusted under 35 U.S.C. 154(b) by 193 days.

(21) Appl. No.: 13/687,287

(22) Filed: Nov. 28, 2012

(65) Prior Publication Data

US 2014/0146441 A1   May 29, 2014

(51) Int. Cl.
*G06F 1/20*   (2006.01)
*H05K 5/00*   (2006.01)
*H05K 7/00*   (2006.01)
*G06F 1/16*   (2006.01)
*H04M 1/02*   (2006.01)

(52) U.S. Cl.
CPC .......... *G06F 1/1679* (2013.01); *H04M 1/0262* (2013.01); *H04M 1/0264* (2013.01); *Y10T 29/49826* (2015.01)

(58) Field of Classification Search
CPC ... H05K 5/03; H05K 5/0086; H04M 1/0262; H04M 1/0264; G06F 1/1679; Y10T 29/49826
USPC .......... 361/679.01, 679.58, 724–727; 429/97
See application file for complete search history.

(56) References Cited

U.S. PATENT DOCUMENTS

| | | | |
|---|---|---|---|
| 7,512,397 B2 * | 3/2009 | Liu et al. | 455/347 |
| 8,205,310 B2 * | 6/2012 | Shi | H01M 2/1066 24/637 |
| 8,787,017 B2 * | 7/2014 | Yoo | H04M 1/0262 292/163 |
| 2010/0160009 A1 * | 6/2010 | Tang | 455/575.4 |
| 2010/0321868 A1 | 12/2010 | Yang et al. | |
| 2011/0159333 A1 | 6/2011 | Xie et al. | |
| 2011/0170242 A1 | 7/2011 | Yuan et al. | |
| 2011/0244311 A1 | 10/2011 | Liang et al. | |

OTHER PUBLICATIONS

Toshiba, "First Time Set Up for the Toshiba TG01", Oct. 13, 2012.

* cited by examiner

*Primary Examiner* — Bernard Rojas
(74) *Attorney, Agent, or Firm* — Hollingsworth Davis, LLC

(57) ABSTRACT

An apparatus includes a chassis with at least one chassis latching member and an outward facing, protruding portion. A cover of the apparatus includes an opening that encompasses the protruding portion of the chassis and at least one cover latching member that interfaces with the chassis latching member. The cover is slidably disengagable from the chassis by applying a first force on the protruding portion of the chassis in a first direction and applying a second force on the cover in a second direction.

17 Claims, 9 Drawing Sheets

USER-REMOVABLE DEVICE COVER

BACKGROUND

Personal mobile devices are increasingly popular with consumers. A wide variety of mobile devices are available on the market (e.g., tablets, navigation devices, laptops), although smart phones are currently among the most widely adopted mobile devices. Mobile devices may utilize a rechargeable battery. On many devices the batteries are user-replaceable. While there may be some advantages of making batteries non-user-replaceable (e.g., ease of case design), a large number of consumers desire user-replaceable batteries. User-replaceable batteries can be useful in a number of scenarios, such as in the event of premature battery failure, extending device availability without recharging by replacing the battery, etc. In some designs, a removable cover facilitates access to the battery, as well as providing access to other phone features (e.g., memory or SIM card slots).

SUMMARY

The present specification discloses a user-removable device cover. In one embodiment, an apparatus includes a chassis with at least one chassis latching member and an outward facing, protruding portion. A cover of the apparatus includes an opening that encompasses the protruding portion of the chassis and at least one cover latching member that interfaces with the chassis latching member. The cover is slidably disengagable from the chassis by applying a first force on the protruding portion of the chassis in a first direction and applying a second force on the cover in a second direction.

In another embodiment, an apparatus includes a chassis with a rearward facing, protruding portion, and a cover with an opening that encompasses the protruding portion of the chassis. A latching member slidably couples the cover to the chassis. The cover is removable by asserting a first force on the protruding portion of the chassis in a first direction and a second force on the cover in a second direction.

In another embodiment, a method involves applying a first force on a protruding portion of a mobile device chassis that is accessible via an opening in a cover of the mobile device. A second force is applied on the cover of the chassis in a direction opposite to the first direction. At least part of the cover is slidably disengaged from the chassis in response to the application of the first and second forces.

The above summary is not intended to describe each disclosed embodiment or every implementation. For a better understanding of variations and advantages, reference should be made to the drawings which form a further part hereof, and to accompanying descriptive matter, which illustrate and describe representative embodiments.

BRIEF DESCRIPTION OF THE DRAWINGS

In the following diagrams, the same reference numbers may be used to identify similar/same components in multiple figures.

DETAILED DESCRIPTION

Figure 1:
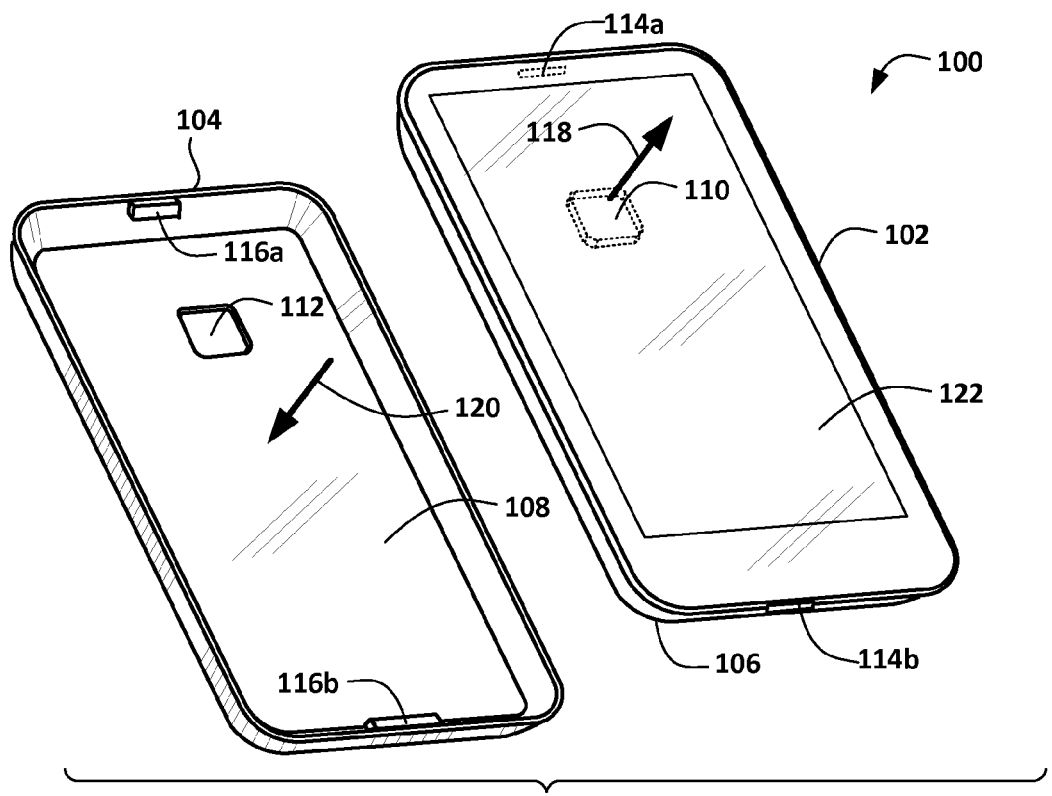
FIGS. 1-4 are perspective views of an apparatus according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the present invention.

The present disclosure is generally related to a user-removable cover for a mobile device. In the following description, an example mobile device is shown as a cellular phone, although it will be appreciated that the concepts described herein may be applied to any similar device (e.g., tablet computer, navigation device, media player, gaming console, etc.). The cover may encompass all or part of a major surface of the mobile device, such as a back surface that faces away from the display. These concepts may be applicable to other covers, such as a partial front cover, side cover, etc.

The term "user-removable cover" generally refers to an arrangement that allows an end-user or other individual to remove the cover without using tools. As such, the cover and/or other parts of the mobile device may include a lock/release mechanism that is releasable in response to the application of force from the user's fingers to particular locations on the device. The lock/release mechanism is designed to securely hold the cover in place on the device if other forces are applied, e.g., due to normal handling, storage, transport, dropping, etc. The removability of the cover allows the user to access a battery or other components (e.g., expandable memory ports, SIM connectors, etc.).

Some covers presently in use rely on an interference fit between the cover and device (e.g., snaps), or use other features such as an externally accessible release mechanism (e.g., button) built into the cover. Where interference features such as snaps are used, the snaps may be hidden between the cover and device. For example, a pry joint or seam may be provided to allow the user to remove the cover. Given the small sizes and tight tolerances in mobile devices, this seam/joint may be hard to find, and further may be hard to open without tools. In some designs, the cover may need to flex somewhat in order to be removed. This flexibility may give a less-than-premium feeling to the device. Also, the interference features (e.g., snaps) are subject to wear and may break if used often.

An externally accessible release member (e.g., button) may avoid some of the issues associated with a snap-fit cover. However, such a button takes valuable real estate on a generally compact device. For aesthetic reasons, it may be desirable to limit the number of features that disturb the outer surface of a mobile device. A cover release button may also be confused with a device actuation button or other feature (e.g., connector cover) leading to accidental release of the cover. Also, the button design may be relatively complicated, e.g., may need to be leak proof, match colors/textures with the outside surface, require space in which to operate, etc.

In embodiments described below, a protrusion of the chassis (e.g., rigidly attached to the chassis) that is accessible through an existing opening in a cover is utilized in a cover attach/release arrangement. This allows for a relatively compact attach/release mechanism to be used, and utilizes an existing feature (e.g., rear-facing camera) unrelated to cover attachment for which provisions in the cover have already been made.

In reference now to FIG. 1, a perspective, exploded view illustrates an apparatus 100 according to an example embodiment. The apparatus 100 includes a chassis portion 102 and a cover 104. The chassis 102 generally includes the bulk of the structure and electronics of the apparatus 100, such as display, controls, battery, processor, motherboard, network interfaces, etc. At least a portion of these structures and electronics may be included in a rearward facing portion 106 of the chassis 102. The rearward portion 106 seats into a cavity 108 of the cover 104 when the cover 104 is installed. The installed cover 104 may be an aesthetic feature of the apparatus 100, as well as providing protection for the rearward portion 106 of the chassis 102.

The chassis 102 may include one or more outward-facing, protruded portions 110 that integrate with the in-place cover 104, and are intended to be exposed/accessible to the user when the cover 104 is in place. An example of such a protrusion 110 is a rearward-facing camera. The protrusion 110 may include any other device or structure rigidly or flexibly mounted to the chassis 102 not primarily intended for use as a cover release mechanism.

The protrusion 110 is encompassed by an opening 112 in the cover 104 when the cover 104 is mated with the chassis 102. It should be noted that the opening 112 need not expose the protrusion 110 to the outside of the device 100 in all cases, but may only need to allow physical contact with the protrusion 110 to facilitate opening operations as described herein. For example, a flexible member (not shown) may be placed over the opening 112. Such a member may protect the protrusion 110 from exposure to air, water, etc., but still allows physical manipulation of (e.g., pushing on) the protrusion.

The chassis 102 includes one or more cover latching members 114a, 114b that interface with respective latching members 116a, 116b of the cover 104. At least one of these interfacing pairs 114a, 116a or 114b, 116b are configured to slidably release in response to a first force 118 on the protruding portion 110 of the chassis 102 in a first direction and a second force 120 on the cover 104 in a second direction. These forces 118, 120 may be in opposite directions, and may be perpendicular/normal to a major surface of the device 100. For purposes of this discussion, a major surface may at least include a surface of the device 100 that include a significant fraction of the total external surface area, such as a surface defined at least in part by display 122 of the chassis 102, and/or an oppositely disposed surface on the back of the cover 104.

Providing the slidable locking/release action may involve using, for example, a spring loaded wedge that slidably locks and unlocks with a wedge-shaped protrusion. Other attachment members that are not separable in this way (e.g., members that hook together) may be used on other portions of the cover 104 or chassis 102. These other attachment members may be detached after the slidable locking member is detached, e.g., by rotating the cover 104 off of the chassis 102 around an axis defined by the other attachment members.

Figure 2:
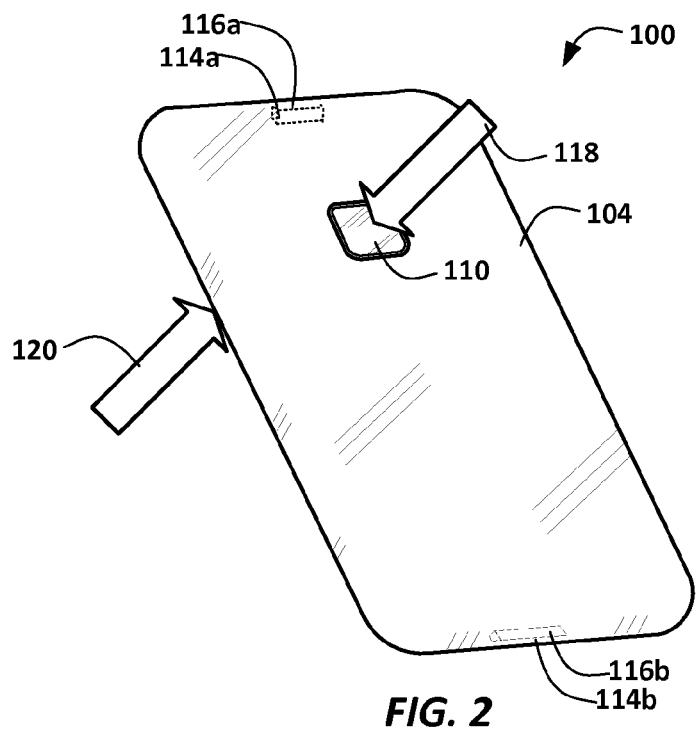
Figure 3:
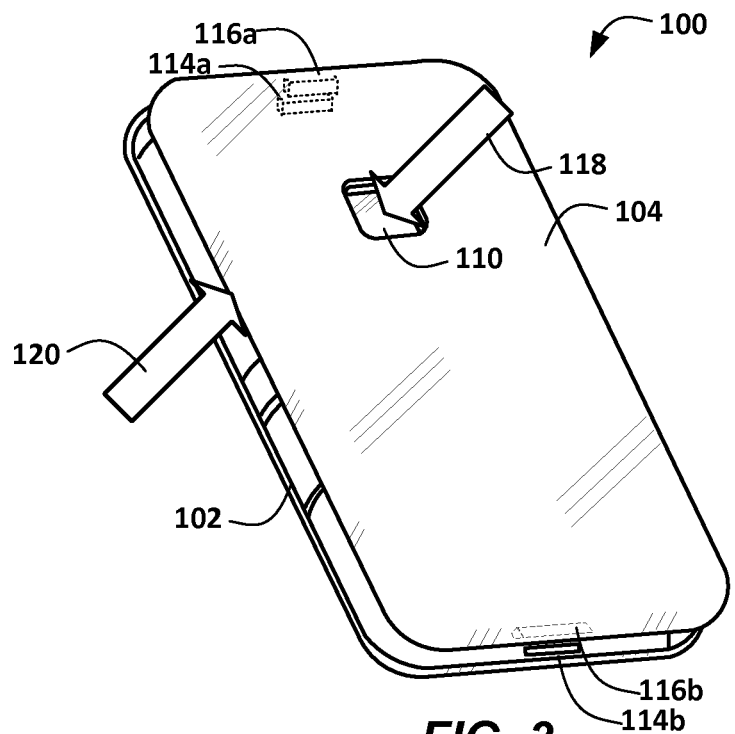
Figure 4:
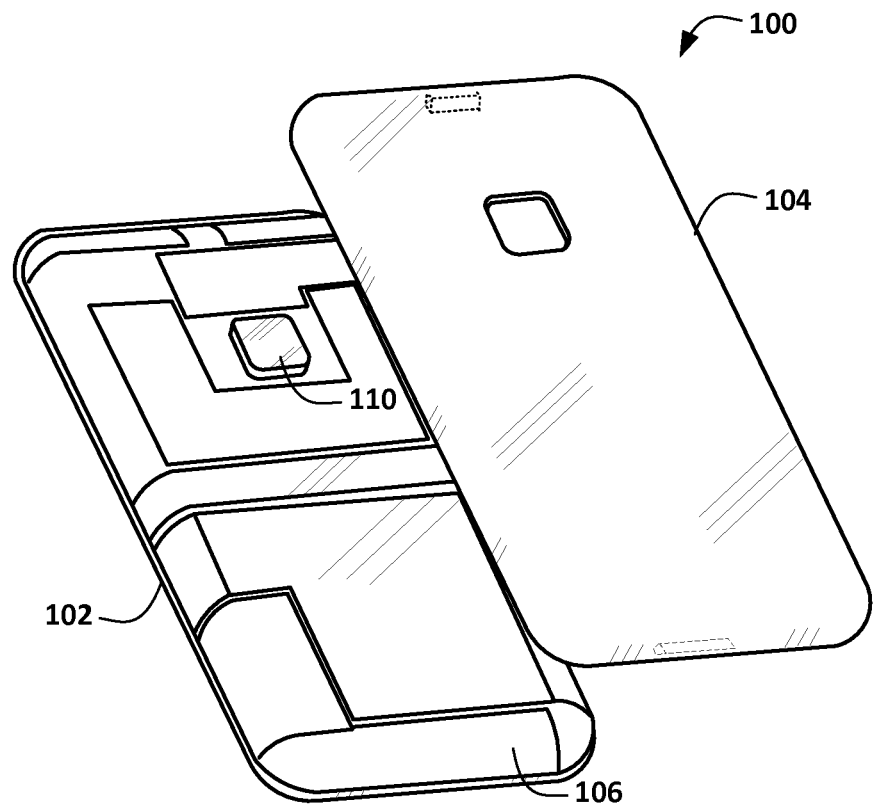

In FIGS. 2-4, perspective views illustrate how the cover 104 may be removed according to an example embodiment. In FIG. 2, the cover 104 is installed on the chassis 102, which is not visible in this view except for the protrusion 110. Force 118 is applied directly to the protrusion 110, while force 120 is applied to an edge of the cover 104. A second force may be applied on an opposing edge (hidden in this view) of the cover 104 in the same direction as force 120. These forces 118, 120 will separate at least one of the mated latching portions 114a/116a, 114b/116b, as is shown in FIG. 3. After full separation, components (e.g., battery, SIM slot) in the rearward portion 106 of the chassis 102 can be accessed as seen in FIG. 4. It should be noted that the location of latching portions 114a/116a, 114b/116b shown in the example device 100 is purely for purposes of illustration, and such latching mechanisms can be located anywhere on the cover 104 and chassis 102. For example, the protruding portion 110 may include, in addition to its primary functional components (e.g., camera lens and housing) a slidable locking member that interfaces with a member of the cover 104, e.g., a member located at or near the opening 112. In another example, multiple slidable locking members may be used, e.g., one per long edge of the cover 104 or chassis 102.

Figure 5:
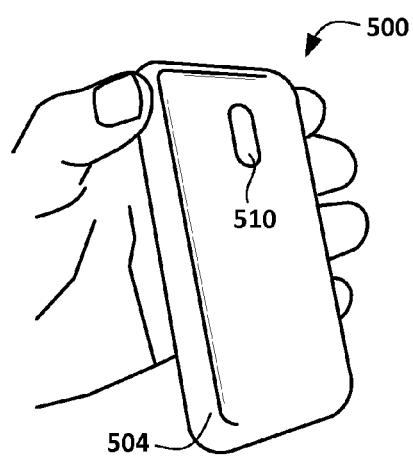
FIGS. 5-8 are perspective views illustrating cover removal according to another example embodiment.
Figure 6:
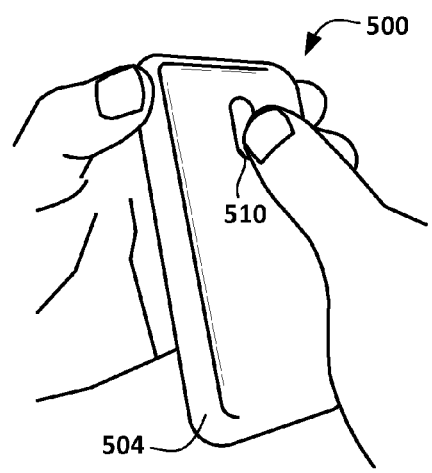

In the example shown in FIGS. 1-4, the cover 104 may be removed by disengaging both latching portions 114a/116a, 114b/116b at once. Other embodiments shown below disengage a first latching member, and thereafter the cover is rotated to disengage one or more other latching members. An example embodiment with such a removable cover is shown in the perspective view of FIGS. 5-8. In FIG. 5, a mobile device 500 is shown being held in one hand with a cover 504 facing outward. A protrusion 510 of the device's chassis (see chassis 502 in FIGS. 7 and 8) is accessible through the cover 504. As shown in FIG. 6, the user's thumb presses on the protrusion 510 while the other hand holds outer edges of the cover 504.

Figure 7:
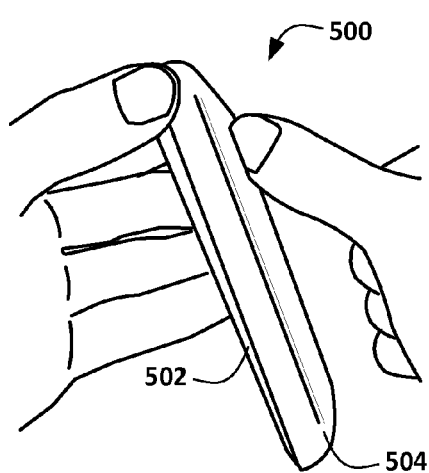
Figure 8:
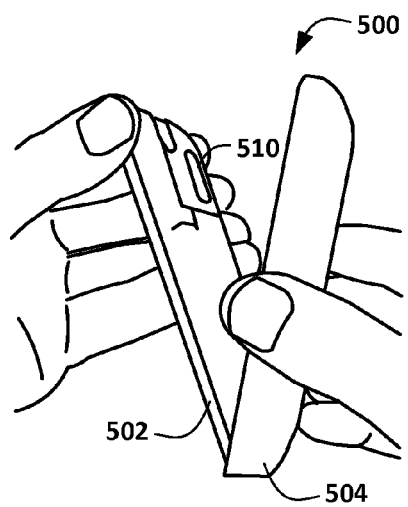

The forces of the users fingers being applied as shown in FIG. 6 causes the cover 504 to separate from the chassis 502 as seen in FIG. 7. Only a top portion of the chassis 502 and cover 504 separate due to this action. Latching portions along the lower edge are designed not to easily pull apart due an application of force normal to the major surface. To fully remove the cover 504, the cover 504 is rotated away from the chassis 502 as shown in FIG. 8. Installation of the cover 504 is generally the reverse of removal, with rotations and forces being applied in the opposite direction shown in these figures. Installation may involve applying pressure on a surface opposite the protrusion, e.g., a display surface of the device 500, in order to complete the final attachment of the cover 504 via the slideable latching member.

As will be described in greater detail below, use of a non-sliding lower latch allows mechanisms holding the lower portion of the cover 504 to the chassis 502 to be fairly simple and reliable. A slidably releasable upper latching portion, while potentially being more complex, can include features that allow the releasing action to be smooth, consistent, and predictable, resulting in a quality feel. Such a mechanism may also be able to undergo significant number of opening and closing cycles without wear or breakage. Because the locking mechanisms do not require the cover 504 to flex when removing or installing, the cover 504 can be made more rigid. As a result, the cover may include materials that do not flex significantly (e.g., glass, ceramics).

Because the cover uses an existing protrusion 510, a clean surface appearance can be maintained.

Figure 9:
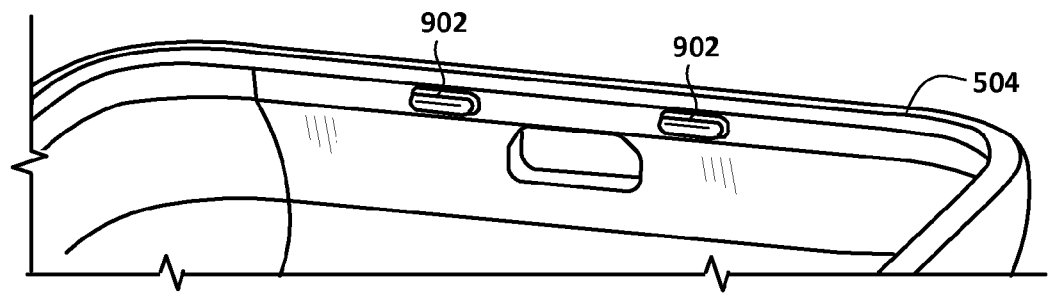
FIGS. 9 and 10 are perspective views of respective cover and chassis portions of a first latching mechanism according to an example embodiment.
Figure 10:
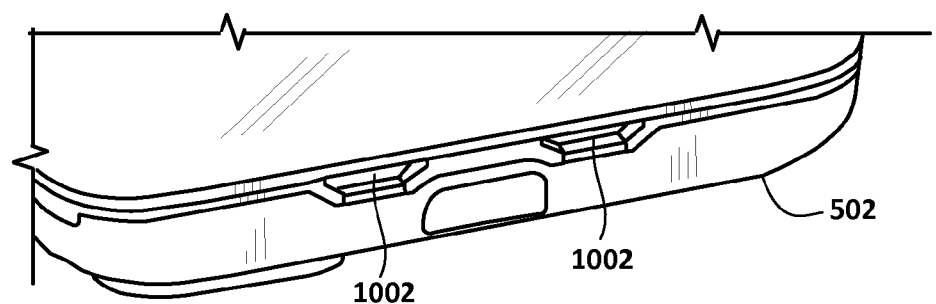
Figure 17:
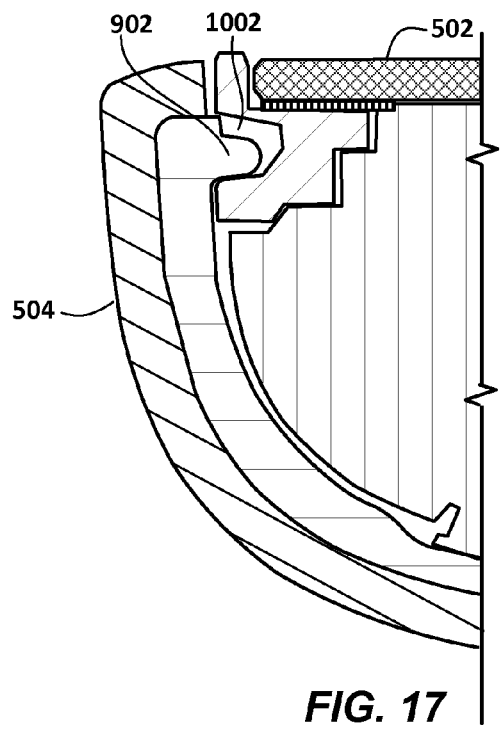
FIG. 17 is a cross-section view of the first latching mechanism as shown in FIGS. 9 and 10.

In reference now to FIGS. 9 and 10, perspective views illustrate details of a first latching mechanism of the mobile device 500 described above. In FIG. 9, protruding latching members 902 are disposed on an inner surface near an edge of the cover 504. The protruding latching members 902 fit within recesses 1002 of the chassis 502 as shown in FIG. 10. This latching mechanism 902, 1002 is designed to lock together when the cover 504 is mated to the chassis 502, and can be separated by rotating the cover 504 relative to the chassis around the protruding latching member 902 and recesses 1002 as shown in FIG. 8. An example of how the latching features 902, 1002 lock together can be seen in the cross sectional diagram of FIG. 17.

Figure 11:
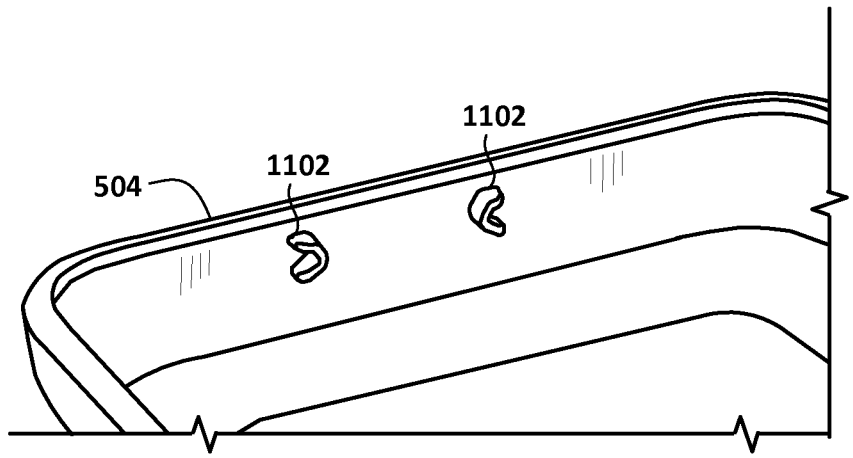
FIGS. 11 and 12 are perspective views of respective cover and chassis portions of a second latching mechanism according to an example embodiment.
Figure 12:
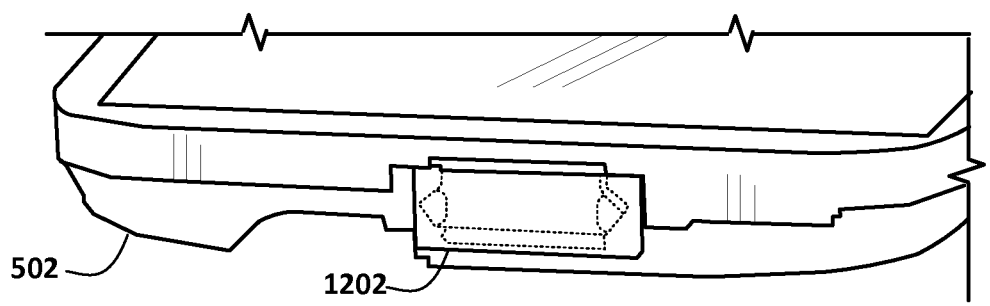
Figure 18:
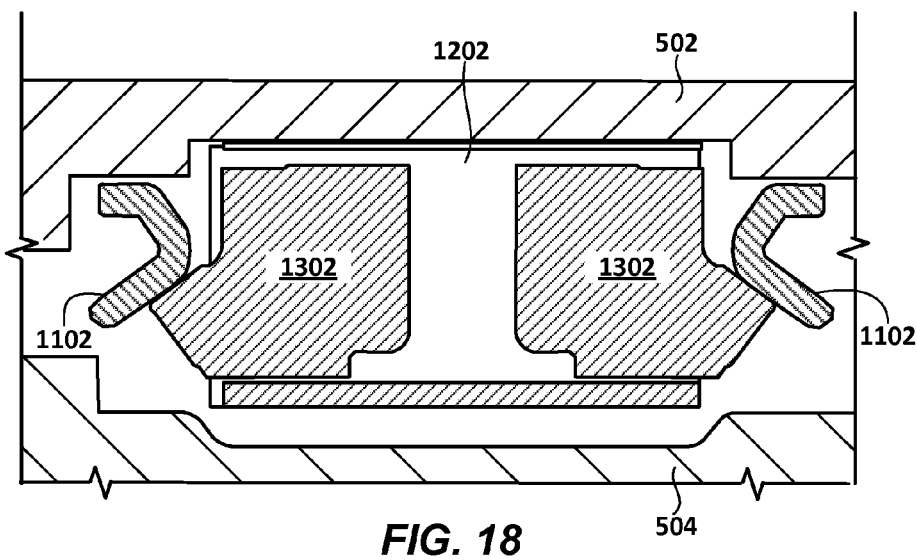
FIG. 18 is an end view of the second latching mechanism shown in FIGS. 11 and 12.

In reference now to FIGS. 11 and 12, perspective views illustrate details of a second, slidable, latching mechanism of the mobile device 500 described above. In FIG. 11, protruding wedge-shaped members 1102 are fixably disposed (e.g., formed integrally with) on an inner surface near an edge of the cover 504. In this example, the wedge-shaped members 1102 are on an end of the cover 504 opposite from where the protruding latching members 902 are located. The wedge-shaped members 1102 slidably lock together with wedges of a locking mechanism 1202 shown on the chassis 502 in FIG. 12. An example of how the locking mechanisms 1102, 1202 lock together can be seen in the end view of FIG. 18.

Figure 13:
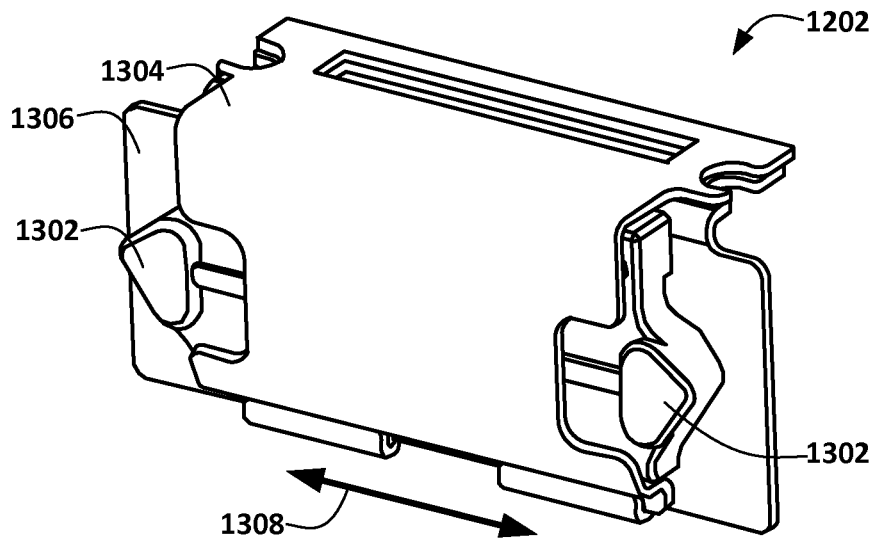
FIGS. 13-16 are perspective views showing details of the second latching mechanism portion shown in FIG. 12.
Figure 14:
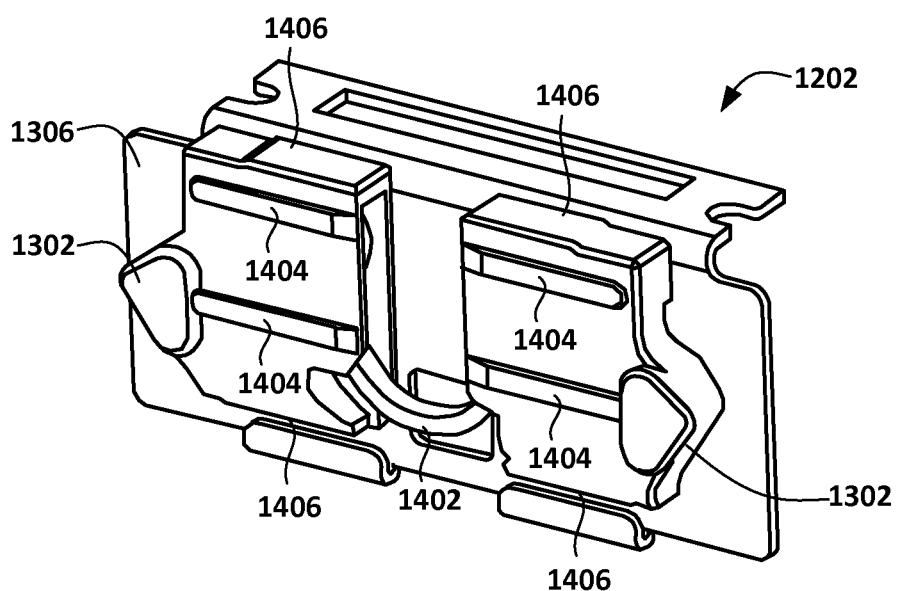

In FIGS. 13-16, perspective views illustrate additional details of locking mechanism 1202 according to an example embodiment. As seen in FIG. 13, the mechanism 1202 includes two sliding wedges 1302 that are enclosed between a cover bracket 1304 and backing bracket 1306. The brackets 1304, 1306 enable the wedges 1302 to slide along directions indicated by arrow 1308, while restraining movement of the wedges 1302 otherwise. In FIG. 14, the mechanism 1202 is drawn without the cover bracket, showing a spring member 1402 that is disposed between the wedges 1302 and that pushes the wedges 1302 away from each other. The wedges 1302 include ribs 1404 that provide a sliding surface between the wedges 1302 and side surface of the cover bracket 1304 (shown in FIG. 13). Another set of ribs (not shown) may slidably interface with backing bracket 1306. Similarly, edge portions 1406 of the wedges 1302 slidably interface with top and bottom surfaces of the cover bracket 1304.

Figure 15:
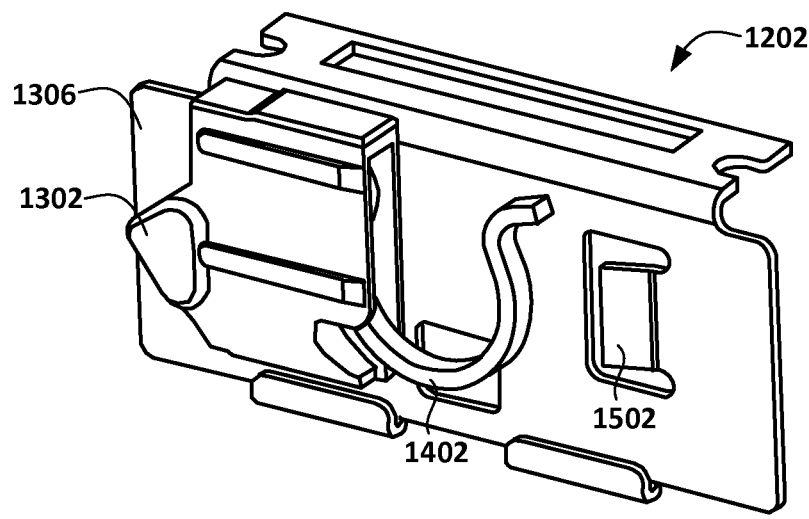
Figure 16:
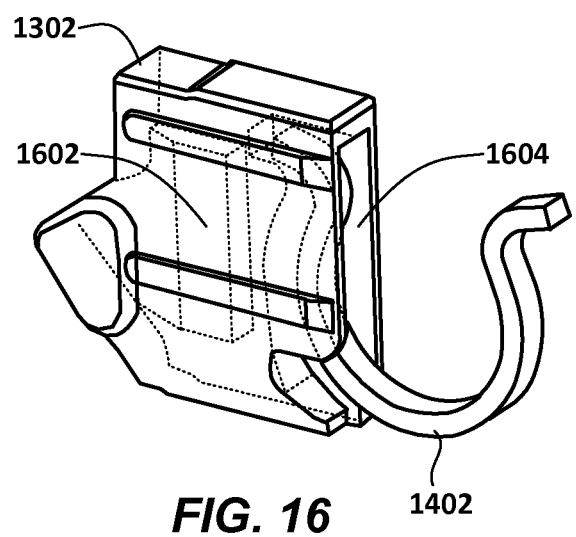

In FIG. 15, a perspective view illustrates the locking mechanism 1202 with one of the wedges 1302 removed. As seen in this view, the backing bracket 1306 includes two stop members 1502 (only one member 1502 is seen in this view) that prevents the wedges 1302 from extending beyond a predetermined extension distance. The spring member 1402 pushes the wedges 1302 to full extension against the stop member 1502. The fully extended wedges 1302 hold interfacing cover wedge members (e.g., wedge-shaped members 1102 in FIG. 11) in place to secure the cover 504. In FIG. 16, a perspective view of one of the wedges 1302 shows additional features via hidden lines. For example, depression 1602 interfaces with a stop member such as member 1502 shown in FIG. 15. Pocket 1604 is shaped to couple the wedge 1302 with the spring 1402.

It will be appreciated that a variety of other slidably engagable and disengagable mechanisms may be used instead or in addition to interlocking wedges. For example, wheels, rollers, ball bearings, elliptical sections, circular sections, etc., may be used in place of one or both of the wedges 1302 and wedge-shaped members 1102. In another example, a spring-loaded locking mechanism such as 1202 could be placed on the cover instead of the chassis, and wedge shaped interfacing members such as 1102 could be placed on the chassis. In yet another example, the points of the wedges 1302 (or similar feature) could be facing each other and be spring-loaded inwardly to one another, opposite the convention shown, e.g., in FIG. 13. This may allow the wedges 1302 (or similar feature) to engage with either side of a single fixed member, e.g., a diamond shaped member having opposing pointed sides, each side interfacing with one of the wedges 1302.

Figure 19:
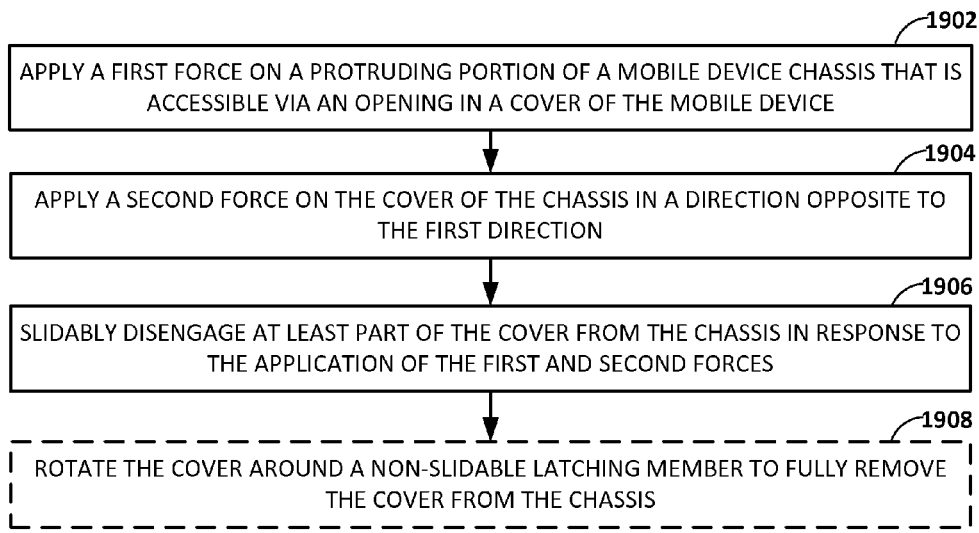
FIGS. 19 and 20 are flowcharts of procedures according to example embodiments.

In reference now to FIG. 19, a flowchart illustrates a procedure for removing a cover according to an example embodiment. The procedure involves applying 1902 a first force on a protruding portion of a mobile device chassis that is accessible via an opening in a cover of the mobile device. A second force is applied 1904 to the cover of the chassis (e.g., edges of the cover) in a direction opposite to the first direction. At least part of the cover is slidably disengaged 1906 from the chassis in response to the application of the first and second forces. Optionally, full removal of the cover may involve rotating 1908 the cover around a non-slidable latching member (e.g., hook or clip).

Figure 20:
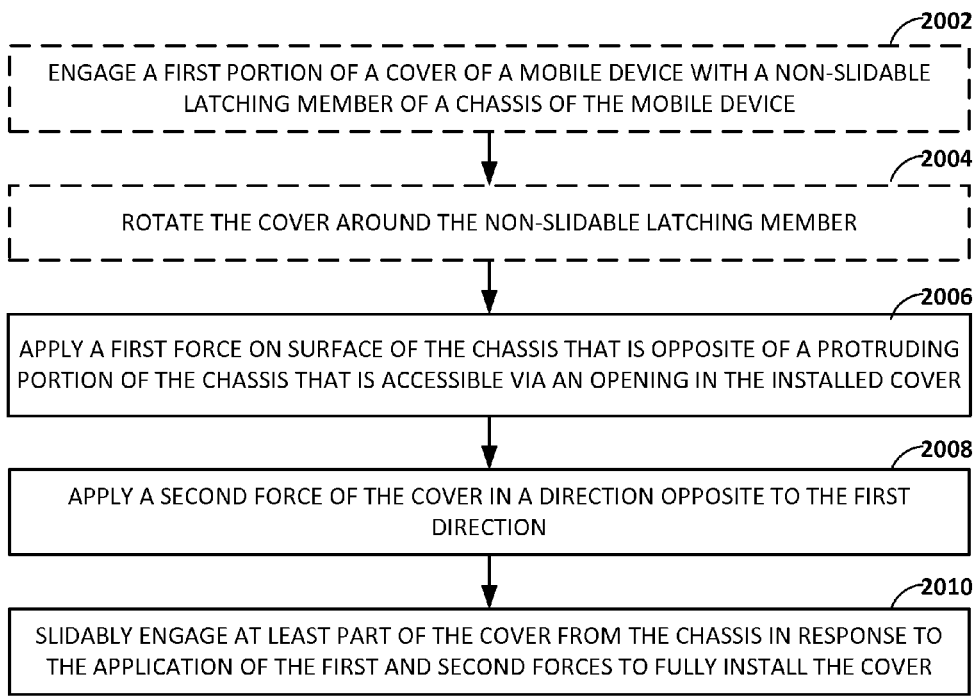

In reference now to FIG. 20, a flowchart illustrates a procedure for removing a cover according to an example embodiment, which may be a cover for a mobile device similar to that described in relation to FIG. 19. The procedure may optionally involve engaging 2002 a first portion of a cover of a mobile device with a non-slidable latching member of a chassis of the mobile device, and then rotating 2004 the cover around the non-slidable latching member. A first force is applied 2006 on surface of the chassis (e.g., front cover, display) that is opposite of a protruding portion of the chassis that is accessible via an opening in the installed cover. A second force is applied 2008 on the cover in a direction opposite to the first direction. Full installation of the cover may involve slidably engaging at least part of the cover with the chassis in response to the application of the first and second forces.

The foregoing description of the example embodiments has been presented for the purposes of illustration and description. It is not intended to be exhaustive or to limit the embodiments to the precise form disclosed. Many modifications and variations are possible in light of the above teaching. It is intended that the scope be limited not with this detailed description, but rather determined by the claims appended hereto.

What is claimed is:

1. An apparatus, comprising:
   a chassis comprising at least one chassis latching member and an outward facing, protruding portion comprising a camera; and
   a user-removable cover comprising an opening that encompasses the protruding portion of the chassis and at least one cover latching member that interfaces with the chassis latching member, wherein the cover is slidably disengagable from the chassis by applying a first force on the protruding portion of the chassis in a first direction and applying a second force on the cover in a second direction.

2. The apparatus of claim 1, wherein the first and second directions are opposite and parallel to one another.

3. The apparatus of claim 1, wherein the second force is applied on two locations of the cover.

4. The apparatus of claim 1, wherein the cover and chassis latching members slidably lock and unlock along the first and second directions, wherein the first and second directions are perpendicular to a major surface of the apparatus.

5. The apparatus of claim 1, wherein the at least one chassis latching member comprises one or more spring-loaded wedges that slidably interface with the at least one cover latching member.

6. The apparatus of claim 5, wherein the cover comprises a second cover latching member that interfaces with a second chassis latching member of the chassis, wherein the second cover and chassis latching mechanisms do not slidably interface.

7. The apparatus of claim 5, wherein the at least one cover latching member comprises a wedge-shaped member.

8. The apparatus of claim 1, wherein the apparatus comprises a mobile device.

9. The apparatus of claim 8, wherein the cover provides access to a battery of the mobile device.

10. An apparatus, comprising:
a chassis comprising a rearward facing, protruding portion comprising a camera;
a cover comprising an opening that encompasses the protruding portion of the chassis; and
a latching member slidably coupling the cover to the chassis, wherein the latching member is disengagable by asserting a first force on the protruding portion of the chassis in a first direction and a second force on the cover in a second direction.

11. The apparatus of claim 10, wherein the first and second directions are perpendicular to a major surface of the apparatus.

12. The apparatus of claim 10, wherein the latching member comprises one or more spring-loaded wedges that slidably interface with wedge-shaped members affixed to one of the cover or chassis.

13. The apparatus of claim 12, further comprising a non-slidable second latching member that couples the cover to the chassis, wherein removal of the cover involves rotating the cover around an axis defined by the second latching member.

14. The apparatus of claim 10, wherein the apparatus comprises a mobile device.

15. A method comprising:
applying a first force on a protruding portion of a mobile device chassis, wherein the protruding portion comprises a camera and is accessible via an opening in a cover of the mobile device;
applying a second force on the cover of the chassis in a direction opposite to the first direction; and
slidably disengaging at least part of the cover from the chassis in response to the application of the first and second forces.

16. The method of claim 15, further comprising rotating the cover around a non-slidable latching member to fully remove the cover.

17. The method of claim 15, wherein the first and second directions are perpendicular to a major surface of the apparatus.

* * * * *